United States Patent

[11] 3,556,271

| [72] | Inventor | Conrad R. Hilpert<br>Winnebago, Ill. |
|---|---|---|
| [21] | Appl. No. | 829,169 |
| [22] | Filed | June 2, 1969 |
| [45] | Patented | Jan. 19, 1971 |
| [73] | Assignee | Twin Disc, Incorporation<br>Racine, Wis.<br>a corporation of Wisconsin |

[54] CLUTCH AND TORQUE CONVERTER TRANSMISSION HAVING AN INTEGRAL GOVERNOR FOR CONSTANT OUTPUT SPEED
6 Claims, 1 Drawing Fig.

[52] U.S. Cl.................................................. 192/3.33,
192/104; 137/56, 137/57
[51] Int. Cl........................................................ F16d 47/06
[50] Field of Search............................................ 192/104F,
3.33

[56] References Cited
UNITED STATES PATENTS

| 3,358,796 | 12/1967 | Hilpert.......................... | 192/3.33 |
| 3,469,663 | 9/1969 | Hilpert et al.................. | 192/3.33 |

*Primary Examiner*—Benjamin W. Wyche
*Attorney*—James E. Nilles

ABSTRACT: A power transmission having a governor controlled friction clutch and torque converter for maintaining a constant ground speed of a vehicle. The governor is centrifugally actuated and is located within the converter housing and is driven by or carried on the turbine of the converter. The centrifugally actuated governor controls a centrifugal valve which is located in a hydraulically actuated and modulatable friction clutch, whereby the amount of clutch engagement can be varied to thereby vary the power input to the converter and maintain the output speed of the converter constant.

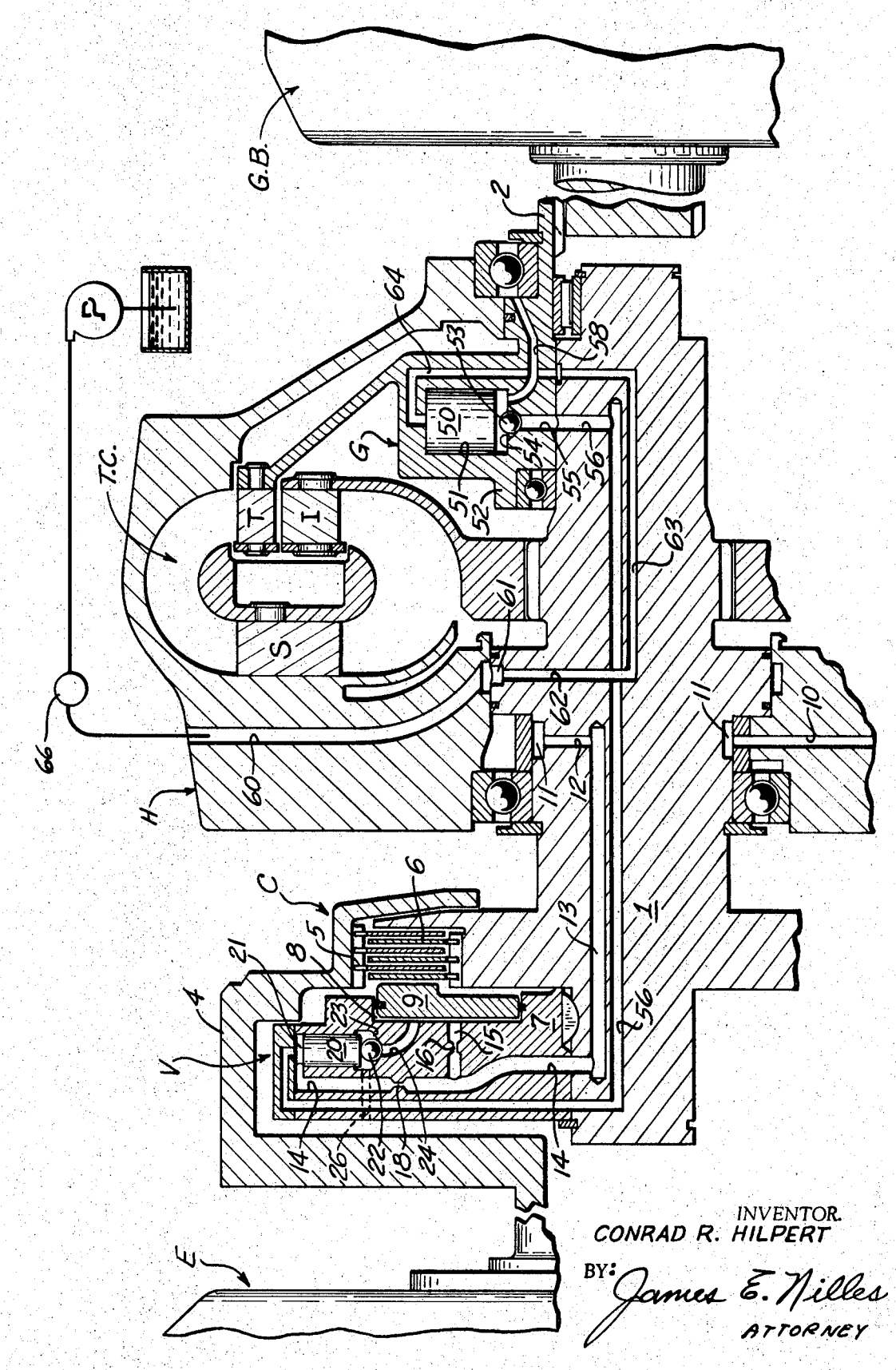
INVENTOR.
CONRAD R. HILPERT
BY: *James E. Nilles*
ATTORNEY 3,556,271

1

CLUTCH AND TORQUE CONVERTER TRANSMISSION HAVING AN INTEGRAL GOVERNOR FOR CONSTANT OUTPUT SPEED

BACKGROUND OF THE INVENTION

The present invention is in the nature of an improvement over the transmission shown in the U.S. Pat. application Ser. No. 725,974, filed May 2, 1968, entitled "Constant Speed Clutch and Torque Converter Transmission," now U.S. Pat. No. 3,469,663 issued Sept. 30, 1969.

The present application, as does the above-mentioned application, Ser. No. 725,974, pertain to power transmissions of the type having a torque converter that is driven from a source of power, through a friction clutch of the type wherein the output side of the clutch is measured or sensed to control the action of the friction clutch.

Conventional torque converter transmissions of this general type have not been satisfactory for vehicles, such as earth working or construction equipment for example, because of the difficulty in maintaining a constant vehicle ground speed under widely varying load or torque output requirements.

In certain earth moving operations, such as grading, constant ground speed is essential. One specific shortcoming of some of the prior art transmissions has been the inability of the friction clutch to properly control the input to the torque converter, which inability was due, among other things, to the variations in the coefficient of friction within the clutch during engaging periods. As the load was suddenly overcome during the operation of such vehicles, the speed of the vehicle would immediately increase, or conversely, as the load increased, the vehicle speed would drop.

Another example of the prior art is shown in my U.S. Pat. No. 3,202,018 of Aug. 24, 1965 in which an arrangement, as shown in FIG. 4 for example, utilizes a balance piston clutch instead of a centrifugally actuated valve for the clutch of the present invention, and also utilizes Pitot tubes in place of a centrifugally actuated valve governor as used with the present invention. That patent required an external hydraulic amplifier 99 in order to increase the signal from the Pitot tubes in order to provide control of the clutch.

Output responsive, friction clutches of the type utilizable with the present invention, for example, are shown and described in the U.S. Pat. No. 3,352,395, issued Nov. 14, 1967; 3,358,796, issued Dec. 19, 1967, both of which are output speed responsive clutches having centrifugally operated valve means, or the U.S. Pat. No. 3,360,087, issued Dec. 26, 1967, and which is an output torque responsive friction clutch. All of the above patents have been assigned to an assignee common with the present application.

SUMMARY OF THE INVENTION

A power transmission including a friction clutch of the type which is controlled by a condition at its output, such as to its speed or torque, and in which the output sensitive clutch is located ahead of and is connected to a torque converter for driving the latter, and a governor is located in the converter housing and is connected to the turbine of the torque converter and is also connected with the said output sensitive clutch, whereby the input to the torque converter is set by the clutch in accordance with the power requirement of the load, to maintain a constant ground speed of the vehicle.

These and other objects and advantages of the present invention will appear hereinafter as this disclosure progresses, reference being had to the accompanying drawings.

BRIEF DESCRIPTION OF THE DRAWING

The drawing is a longitudinal cross-sectional view of a transmission embodying the present invention.

DESCRIPTION OF A PREFERRED EMBODIMENT

In the power transmission of the present invention, a hydraulically actuated friction plate clutch C receives its power from an engine E and delivers power through the clutch output shaft 1 and to an impeller I of the torque converter TC. The torque converter in turn delivers power from the turbine assembly T and to the output shaft 2 of the transmission. The output shaft 2 then delivers power, for example, to a change speed gear box GB which may be of the type shown in the U.S. Pat. No. 3,425,293 issued Feb. 4, 1969, and assigned to an assignee common to the present invention.

More specifically, the hydraulically actuated friction plate clutch is of the type which can be modulated, that is to say, it can be made to slip in varying degrees to thereby vary the power transmitted through the clutch. The clutch includes the housing 4 which is driven from the engine and which has clutch plates 5 axially splined thereto. Plates 5 are interleaved with clutch plates 6 that are similarly axially splined to the hub member 7 of the clutch. The hub member 7 defines a cylindrical clutch-actuating chamber 8 in which an annular piston 9 is sealingly slideable to form an expansible chamber. When the chamber 8 is pressurized with pressure fluid, the piston is urged to the right (as viewed in the drawings) to cause clamp up of the interleaved clutch plates and thus transmission of power from the engine to the clutch output shaft 1. The degree to which the piston can apply pressure to the plates can be varied, so as to thereby cause a modulating action of the clutch as above-mentioned.

Constant pressure fluid, which is commonly referred to as supply or actuating pressure, is introduced through a passage 10 in the stationary torque converter housing H, an annular groove 11 in the clutch output member, the radial ports 12, the rifle drilling 13, through the radially extending passage 14 in the clutch hub 7 and then through a port 15 having orifice 16 therein, and into the expansible chamber 8. In this manner, high pressure fluid can be introduced to the actuating chamber to cause clutch clamp up, and it is this pressure fluid that can be varied, as will appear. Passage 14 also extends radially outwardly to the outer end of a centrifugal valve V located in the member 7 of the clutch. Another orifice 18 is interposed in line 14 just ahead of the valve V.

The centrifugally operated valve V includes a radially shiftable piston 20 in a chamber 21, and pressure fluid introduced to the outer end of the piston 20 urges it inwardly to thereby in turn force the shiftable ball 22 of the valve against the valve seat 23. Chamber 21 is placed in communication with the actuating chamber 8 via the passage 24 leading from the valve seat 23 to the chamber 8. Thus, when the ball 22 is seated on its seat 23, pressure fluid cannot be exhausted from chamber 8 via passage 24 and port 26. On the other hand, when pressure on the outer end of the piston 20 is insufficient, centrifugal action forces the piston 20 radially outwardly, thus permitting the ball 22 to move radially outwardly and in turn, permit fluid to be dumped from chamber 8 via passage 26. By thus regulating the valve V by the amount of pressure fluid on its radially outer piston 20, the amount of clutch clamp-up can be varied.

As will appear more fully later, if the transmission is rotating faster than the pressure at the outer end of the valve V is set for, the centrifugal force pushes the piston outwardly, thus permitting the ball 22 to open the valve seat and dump some of the pressure fluid from actuating chamber 8. This causes slipping of the clutch and a reduction of the transmission speed.

With the above arrangement, a hydraulically actuated friction clutch has a centrifugal control means that is sensitive to the output of the clutch, said means acting to control the degree of clutch engagement.

A centrifugally actuated governor means G is provided for automatically regulating the amount of control pressure permitted to act on the valve V, in accordance with the output speed of the turbine assembly of the converter. More specifically, the governor G is a centrifugally actuated, turbine driven governor that is located inside the converter housing and may be made integral with the turbine assembly T. As will appear, the turbine driven governor G controls the impeller clutch C to maintain a constant turbine speed regardless of the load on the output end of the transmission. This constant turbine speed can be set by the operator.

Referring more specifically to the centrifugally actuated, turbine driven governor G, it includes a piston 50 slideable in a radially extending chamber 51 which is formed in the hub member 52 of the turbine assembly. A shiftable valve element in the form of a ball 53 can close the valve seat 54 to close the port 55 which in turn is connected via passage 56 to the outer end of piston chamber 21.

The governor piston 50 is forced radially inwardly to hold the ball 53 on its seat when sufficient fluid pressure is supplied at the radially outer end of the piston 50, as follows. This control pressure is supplied from a source, such as a fluid pump P, through passage 60 in the torque converter housing, annular groove 61, port 62, and rifle drilling 63 in the shaft 1. This control pressure then is directed through the radially extending passage 64 in the turbine assembly tub 52 where it is directed to the outer end of governor chamber 51. Thus, the operator by regulating a control valve 66, can determine the pressure applied to the radially outer end of the governor G, and consequently, can determine the rotational speed of the turbine at which the clutch will begin to release.

When the ball 53 is unseated, the pressure fluid at the outer end of the piston 20 of the valve V can be vented through passage 56, port 55 and passage 58. This occurs when the rotational speed of the torque converter output, that is the turbine assembly T, rises above a predetermined speed, thereby causing centrifugal force to shift the piston 50 in a radially outward direction, permitting ball 53 to unseat. This in turn causes pressure fluid to vent from the outer end of valve V and consequently, permits clutch slipping and a decrease in output speed back down to the predetermine setting.

Cooling fluid is conducted from the toroidal circuit of the converter and past the friction plates 5 and 6 in the conventional manner (not shown).

In accordance with the present invention, a centrifugal acting turbine driven governor G located within the torque converter housing, acts to bleed supply fluid pressure from the centrifugal valve of the output sensitive clutch, and the setting of this governor G can be selected by the operator to maintain a constant rotational speed of the torque converter output, as reflected by the turbine assembly. This is accomplished by causing clutch engagement as the transmission output speed decreases and conversely, permitting clutch slipping as the output speed of the transmission increases.

I claim:

1. A power transmission for maintaining constant ground speed of a vehicle comprising; a power source; an output sensitive and hydraulically actuated friction clutch having control means which is sensitive to clutch output for controlling clutch engagement, said clutch connected to and driven from said power source; a torque converter having a housing and driven by said clutch and having a turbine assembly within said housing, and a centrifugally actuated governor mounted within said housing and attached to and driven by said turbine assembly for sensing the output speed of said converter and also connected to said clutch for controlling the actuating fluid in the hydraulically actuated clutch in accordance with the output speed of said converter, whereby said clutch controls the power input to said torque converter to maintain the output speed of the converter constant.

2. The transmission set forth in claim 1 further characterized in that said output sensitive clutch includes a centrifugally actuated control valve for controlling the pressure fluid that causes actuation of said hydraulically actuated friction clutch.

3. The transmission according to claim 2 including a source of control pressure fluid connected with said governor for adjusting said governor, and fluid conduit means from said control valve and to said governor whereby the governor can dump pressure fluid from said hydraulically actuated clutch via said control valve.

4. A power transmission for maintaining constant ground speed of a vehicle comprising; a power source; an output sensitive and hydraulically actuated friction clutch having control means which is sensitive to clutch output for controlling clutch engagement, said clutch connected to and driven from said power source; a torque converter driven by said clutch and having a turbine assembly within a housing, and a centrifugally actuated governor mounted in said turbine assembly for sensing the output speed of said converter and connected to said control means for controlling the actuating fluid in the hydraulically actuated clutch in accordance with the output speed of said converter, whereby said clutch controls the power input to said torque converter to maintain the output speed of the converter constant.

5. The transmission set forth in claim 4 further characterized in that said output sensitive clutch includes a centrifugally actuated control valve for controlling the pressure fluid that causes actuation of said hydraulically actuated friction clutch.

6. The transmission according to claim 5 including a source of control pressure fluid connected with said governor for adjusting said governor, and fluid conduit means from said control valve and to said governor whereby the governor can dump pressure fluid from said hydraulically actuated clutch via said control valve.